Oct. 26, 1954

K. E. RAPP 2,692,576

MILKING PAIL UNIT

Filed June 14, 1949

Inventor

Kenneth E. Rapp

By

Webster & Webster

ATTORNEYS

Oct. 26, 1954  K. E. RAPP  2,692,576
MILKING PAIL UNIT
Filed June 14, 1949  2 Sheets-Sheet 2
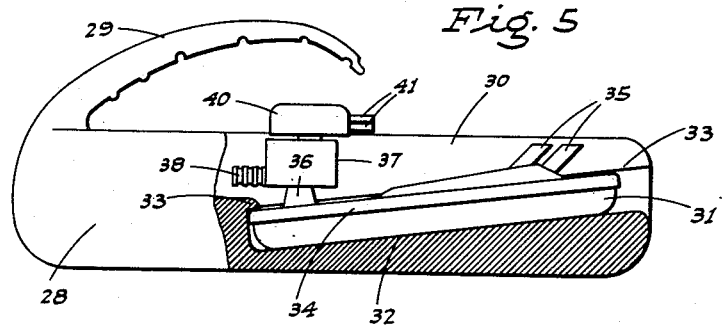
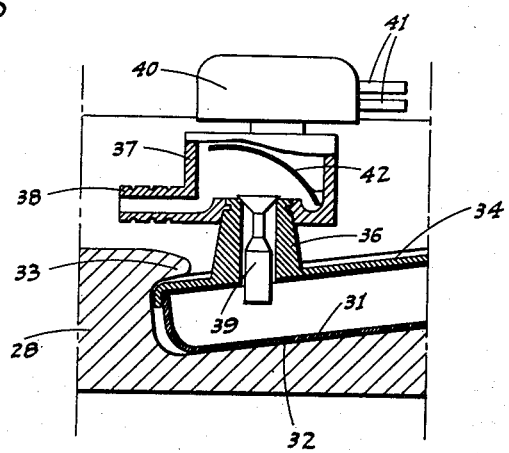
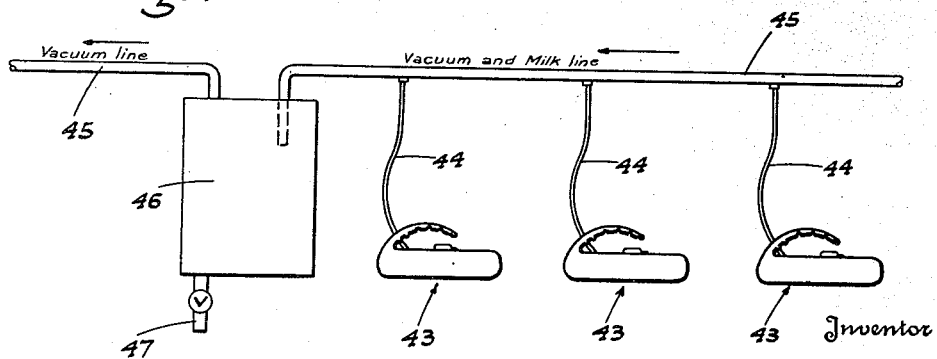
Inventor
Kenneth E. Rapp
By
ATTORNEYS Patented Oct. 26, 1954

2,692,576

UNITED STATES PATENT OFFICE 2,692,576

MILKING PAIL UNIT

Kenneth E. Rapp, near Turlock, Calif.

Application June 14, 1949, Serial No. 98,890

10 Claims. (Cl. 119—14.54)

This invention is directed to, and it is an object to provide, an improved automatic milking system for dairy use; the system being operative to feed the milk from each of a plurality of pail units to a milk accumulating reservoir, thus avoiding the necessity of manually emptying each pail unit when full, and preventing overflow.

Another object of the invention is to provide a milking system, as in the preceding paragraph, wherein the vacuum conduit is employed as the flow line for the milk between the pail units and milk accumulating reservoir.

A further object of the invention is to provide a novel pail unit for use in an automatic milking system as above; such pail unit being simple in structure, easy to clean, and having desirable weight and balance.

An additional object of the invention is to provide a pail unit, for the purpose described, which includes a removable milk receiver mounted in a frame or holder in novel manner.

A still further object of the invention is to provide a pail unit which, in certain embodiments, is formed with a novel baffle to prevent milk flow to the included pulsator, but without restricting milk flow from the milk receiver into the vacuum conduit for delivery to the accumulating reservoir.

It is also an object of the invention to provide a pail unit designed for ease and economy of manufacture.

An additional object of the invention is to provide a practical and reliable automatic milking system and pail units therefor, and yet which are exceedingly effective for the purpose designed.

These objects are accomplished by means of such structure and relative arrangement of parts as will be exceedingly effective for the purpose designed.

In the drawings:

Fig. 5 is a side elevation, partly broken away, of another modification of the pail unit.

Fig. 6 is an enlarged fragmentary sectional elevation of the pail unit shown in Fig. 5.

Fig. 7 is a diagrammatic view of the milking system.

Figure 1:
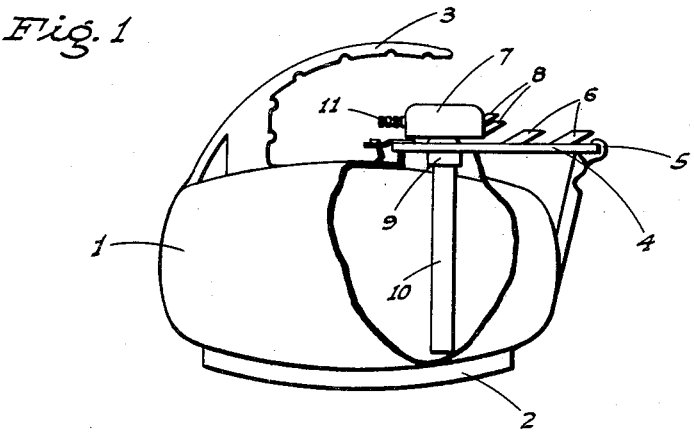
Fig. 1 is a side elevation, partly broken away, of a pail unit embodying the invention.

Referring now more particularly to the characters of reference on the drawings, and at present to the embodiment of the pail unit shown in Fig. 1, the numeral 1 indicates a milk pail having a relatively heavy base 2 and fitted on top with an overhanging suspension handle 3. The suspension handle 3 is adapted for adjustable engagement with a belt unit which encircles the cow's body head of the udder.

At the top forward portion thereof the milk pail 1 is provided with a removable plate 4, secured in place by detachable fastening means, indicated in part at 5.

Milk enters the pail 1 through the plate 4 by means of fittings 6 to which the milk hoses (not shown) connect; such milk hoses leading to the usual teat cups.

A pulsator 7 is mounted on the plate 4 and includes fittings 8 to which the pulsator hoses (not shown) connect, but which pulsator hoses lead to the teat cups in the usual manner.

The pulsator 7 has a suction connection 9 extending downwardly through the removable plate 4, and a milk pick-up tube 10 extends from the suction connection 9 downwardly to a point adjacent but short of the bottom of the milk pail 1.

A fitting 11 extends from the pulsator 7, and is adapted for connection with a vacuum hose of the milking system, as will hereinafter appear.

As the milk delivers into the milk pail 1 through the fittings 6 such milk is picked up by vacuum into the tube 10, and thence flows through the pulsator 7 and fitting 11 into the vacuum hose, and is subsequently separated from the vacuum flow and accumulated, as will hereinafter appear.

With this arrangement the milk is constantly withdrawn from the pail 1, avoiding the necessity of manually and recurringly emptying the same.

Also, as there is not a varying quantity of milk in the pail 1, its weight remains substantially constant, as is desirable in pail units which are belt suspended from the body of a cow, and additionally the balance of the pail unit can be better maintained.

Figure 2:
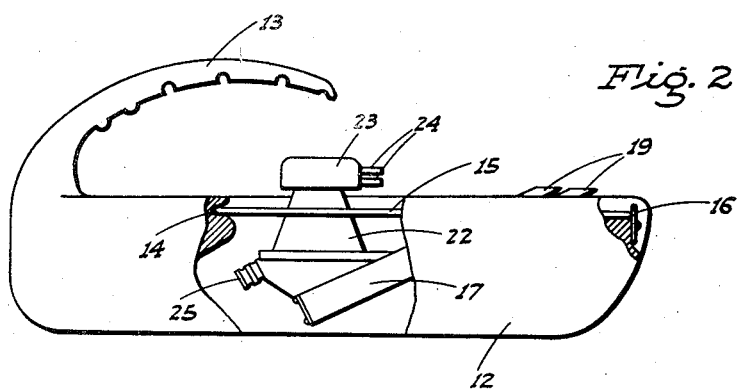
Fig. 2 is a similar view of a modified pail unit.
Figure 3:
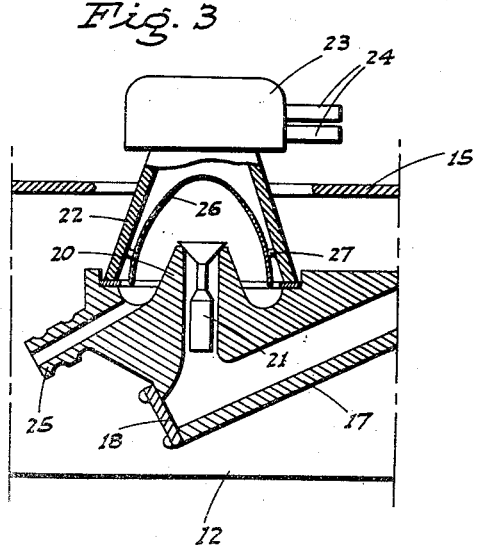
Fig. 3 is an enlarged fragmentary sectional elevation of the pail unit shown in Fig. 2.
Figure 4:
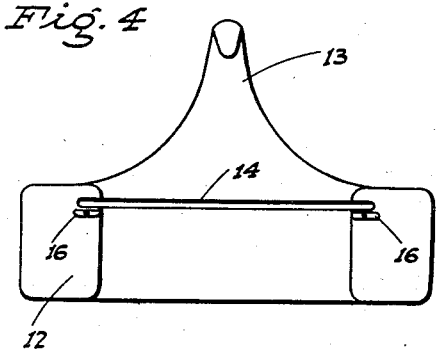
Fig. 4 is a front end view of the holder, detached, used in the embodiment of Figs. 2 and 3.

In Figs. 2-4, inclusive, a modified pail unit is shown, which pail unit is of limited depth, as is desirable for use in connection with cows with low slung bodies or low udders.

This embodiment of the pail unit comprises a relatively heavy, substantially horizontal U-shaped frame or holder 12, having an overhanging suspension handle 13 merging with said holder at its rear end.

The U-shaped holder 12 is horizontally slotted about its inner wall, as at 14, for the removable reception in such slot of a horizontal mounting plate 15; such mounting plate 15 being removable but normally secured in place by turn catches 16.

A shallow, enclosed, pan-like milk receiver 17 is secured in connection with the mounting plate 15 below the same, and at a downward and rearward incline; such receiver 17 including a bottom end cap 18 removable to permit of convenient cleaning of said receiver.

At its upper end the receiver 17 is in communication with fittings 19 which project above the mounting plate 15 for connection with the milk hoses (not shown). At its inner or lowermost end the milk receiver 17 is formed with an upstanding tubular stem 20 having an upwardly opening check valve 21 associated therewith; such tubular stem 20 being enclosed within a frusto-conical neck 22 which communicates at its upper end with, and supports, a pulsator 23 having fittings 24 for connection with the pulsator hoses. As clearly shown in Fig. 3, the neck 22 is hollow and thin walled, and thus obviously forms a chamber of appreciable size.

A fitting 25 leads into the neck 22 at the bottom thereof, and such fitting 25 is adapted for connection to a vacuum hose of the milking system.

An inverted cup-like milk baffle 26 is secured by spider elements 27 in the frusto-conical neck 22 above the tubular stem 20 and check valve 21. This inverted cup-like baffle 26 prevents milk flow into the pulsator 23, but does not restrict access of vacuum to the latter.

When the pail unit of Figs. 2-4 is in use the milk flows into the receiver 17 and thence delivers through the check-valved tubular stem 20, being deflected by the baffle 26 so that it flows out the fitting 25 into the vacuum hose.

As this embodiment of the pail unit does not provide for the retention of any substantial volume of milk therein, the weight of the pail unit, as well as its balance, remains substantially the same at all times, which is important, as hereinbefore indicated.

As the holder 12 is of limited height, the pail unit is admirably suited for use in connection with a cow having a low slung body or a low udder. However, the holder 12, being U-shaped, can be made relatively heavy, with such distribution of weight as may be desired.

In Figs. 5 and 6 a further embodiment of the pail unit is disclosed, and comprises a relatively heavy holder 28 likewise shallow or of limited depth, for the purpose as above; such holder including an overhanging suspension handle 29 which merges with the holder at its rear end.

The holder 28 is formed with a cavity 30, open top and front of said holder. A shallow, enclosed, pan-like milk receiver 31 is removably engaged in the cavity 30 resting on the bottom 32 thereof, which bottom inclines downwardly in a rearward direction.

The milk receiver 31 is retained against upward escape from the holder 28 by means of overhanging lips 33 formed within the cavity 30 at the back end on opposite sides thereof. For cleaning the milk receiver 31 it may be slid forwardly out of the holder 28, whereupon the lid 34 is removable for cleaning of the parts.

At the forward end portion thereof the lid 34 is provided with fittings 35 for connection to the milk hoses.

At the inner end thereof the receiver 31 is formed with a tubular stem 36 supported by the lid 34 and communicating between said receiver and a chamber 37; the bottom of said chamber being in communication with a fitting 38 adapted for connection with the vacuum hose of the milking system.

An upwardly opening check valve 39 works in the tubular stem 36, and a pulsator 40 is mounted on and communicates with the chamber 37; such pulsator including fittings 41 for connection with the pulsator hoses.

A milk baffle 42 is interposed in the chamber 37, whereby to prevent access of milk into the pulsator 40, but without restricting vacuum flow between said pulsator and the fitting 38.

This embodiment of the pail unit functions in substantially the same manner as the embodiment of Figs. 2-4, inclusive.

The milk flows through the fittings 35 into the receiver 31, and thence passes upwardly through the check-valved stem 39 into the chamber 37. From the chamber 37 the milk flows through fitting 38 into the vacuum hose along with the vacuum flow.

The milking system in which the pail units, of any embodiment, are adapted to be used is shown diagrammatically in Fig. 7, wherein:

A plurality of pail units are indicated at 43, each being coupled by a vacuum hose to a vacuum conduit 45. The milk, together with the vacuum flow, feeds from each pail unit 43, in the manner previously described, into the related vacuum hose 44, and thence into the conduit 45.

A milk accumulating reservoir 46 is interposed in the vacuum conduit 45 between the vacuum pump (not shown), and the point of connection of the vacuum hoses 44; such milk accumulating reservoir being arranged so that the milk falls out of the vacuum flow and thence does not continue on to the vacuum pump.

When the milk in the accumulating reservoir 46 reaches a predetermined level it is withdrawn by means of a valved conduit 47 for subsequent processing.

The above described automatic milking system, together with the novel pail units embodied therein, provides for the practical and convenient milking of cows; there being no necessity of attendance to the pail units during the milking operation, as such pail units need not be manually emptied.

From the foregoing description it will be readily seen that there has been produced such a pail unit as substantially fulfills the objects of the invention as set forth herein.

While this specification sets forth in detail the present and preferred construction of the pail unit, still in practice such deviations from such detail may be resorted to as do not form a departure from the spirit of the invention, as defined by the appended claims.

Having thus described the invention, the following is claimed as new and useful, and upon which Letters Patent are desired:

1. A pail unit, for an automatic milking system, comprising a holder, a mounting plate supported by the holder, a milk receiver suspended from the mounting plate, milk hose fittings on the receiver, a pulsator mounted on the receiver, passage means establishing communication between the pulsator and receiver, pulsator hose fittings on the pulsator, and a fitting in communication with said passage means adapted to connect to a vacuum hose.

2. A pail unit, for an automatic milking system, comprising a mounting plate, a milk receiver and pulsator assembly on the plate, a holder, and means removably supporting the plate on the holder; the holder being relatively shallow, and the plate being substantially horizontally disposed on said holder.

3. A pail unit, for an automatic milking system, comprising a mounting plate, a milk receiver and pulsator assembly on the plate, a holder, and means removably supporting the plate on the holder; the holder being relatively shallow, the plate being horizontally disposed on said holder, and a suspension handle on the holder overhanging the same.

4. A pail unit, for an automatic milking system, comprising a mounting plate, a milk receiver and pulsator assembly on the plate, a holder, and means removably supporting the plate on the holder; the holder including a generally horizontal U-shaped portion, adjacent walls of said portion being longitudinally slotted, and the mounting plate slidably engaging along opposite side edges in the slots.

5. A pail unit, for an automatic milking system, comprising a mounting plate, a milk receiver and pulsator assembly on the plate, a holder, and means removably supporting the plate on the holder; the holder including a generally horizontal U-shaped portion, adjacent walls of said portion being longitudinally slotted, and the mounting plate slidably engaging along opposite side edges in the slots, there being releasable catch means to normally prevent escape of the plate from the holder.

6. A pail unit, for an automatic milking system, comprising a mounting plate, a milk receiver and pulsator assembly on the plate, a holder, and means removably supporting the plate on the holder; the holder being relatively shallow and having spaced portions, and means removably supporting the mounting plate between said spaced portions.

7. A pail unit, for an automatic milking system, comprising a mounting plate, a milk receiver and pulsator assembly on the plate, a holder, and means removably supporting the plate on the holder; the holder being relatively shallow and having spaced portions, means removably supporting the mounting plate between said spaced portions, and a suspension handle on the holder overhanging the same.

8. A pail unit, for an automatic milking system, including a holder, a shallow enclosed pan-like milk receiver on the holder, an upstanding tubular stem on the receiver in communication therewith, a chamber on the receiver into which the tubular stem opens, a pulsator in communication with the chamber at its upper end, and a fitting for a vacuum hose connected to the chamber; there being a milk baffle in the chamber above the stem, the fitting communicating with the chamber below said baffle.

9. A pail unit, as in claim 8, in which the milk baffle is of inverted cup shape, and means supporting the baffle centrally above the tubular stem.

10. A pail unit, for an automatic milking system, including a holder, a shallow enclosed pan-like milk receiver, means supporting the receiver on the holder at an inclination, an upstanding tubular stem on the low end portion of the receiver and in communication with the latter, a chamber on the receiver into which the tubular stem opens, a pulsator in communication with the chamber at its upper end, and a fitting for a vacuum hose connected to the chamber.

References Cited in the file of this patent

UNITED STATES PATENTS

| Number | Name | Date |
|---|---|---|
| 514,551 | Hussey et al. | Feb. 13, 1894 |
| 594,860 | Cushman | Dec. 7, 1897 |
| 778,227 | Devore | Dec. 27, 1904 |
| 1,206,096 | Dinesen | Nov. 28, 1916 |
| 1,210,818 | Lindstrom | Jan. 2, 1917 |
| 1,344,140 | McCartney | June 22, 1920 |
| 1,383,369 | Babson | July 5, 1921 |
| 1,384,266 | Maes | July 12, 1921 |
| 1,394,433 | Leitch | Oct. 18, 1921 |
| 1,398,230 | Hall | Nov. 29, 1921 |
| 1,486,671 | Maes | Mar. 11, 1924 |
| 1,491,791 | Dinesen | Apr. 29, 1924 |
| 1,491,792 | Dinesen | Apr. 29, 1924 |
| 1,515,707 | Stampen | Nov. 18, 1924 |
| 1,653,756 | Babson | Dec. 27, 1927 |
| 1,718,822 | Hulbert | June 25, 1929 |
| 1,736,010 | Oakes | Nov. 19, 1929 |
| 1,825,645 | Martin, Jr. | Sept. 29, 1931 |
| 1,859,213 | McCornack | May 17, 1932 |
| 1,859,214 | McCornack | May 17, 1932 |
| 1,875,083 | McCornack | Aug. 30, 1932 |
| 2,122,471 | Hulbert | July 5, 1938 |
| 2,253,341 | Michaels | Aug. 19, 1941 |
| 2,304,746 | Anderson | Dec. 8, 1942 |
| 2,458,779 | Hodsdon | Jan. 11, 1949 |
| 2,460,426 | Maes | Feb. 1, 1949 |

FOREIGN PATENTS

| Number | Country | Date |
|---|---|---|
| 975,164 | France | Oct. 11, 1950 |